US012797845B2

(12) United States Patent
Ando et al.

(10) Patent No.: US 12,797,845 B2
(45) Date of Patent: Nov. 17, 2026

(54) SYNTHETIC QUARTZ GLASS SUBSTRATE FOR USE IN MICROFLUIDIC DEVICE, SYNTHETIC QUARTZ GLASS MICROFLUIDIC DEVICE, AND METHOD FOR MANUFACTURING THE SAME

(71) Applicant: Shin-Etsu Chemical Co., Ltd., Tokyo (JP)

(72) Inventors: Masao Ando, Joetsu (JP); Hiroyuki Yamazaki, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 974 days.

(21) Appl. No.: 18/083,093

(22) Filed: Dec. 16, 2022

(65) Prior Publication Data

US 2023/0191397 A1 Jun. 22, 2023

(30) Foreign Application Priority Data

Dec. 21, 2021 (JP) ................................. 2021-206939

(51) Int. Cl.
*B01L 3/00* (2006.01)
*B32B 3/30* (2006.01)
(Continued)

(52) U.S. Cl.
CPC ... *B01L 3/502707* (2013.01); *B01L 3/502715* (2013.01); *B32B 3/30* (2013.01);
(Continued)

(58) Field of Classification Search
CPC ......... B01L 3/502707; B01L 3/502715; B32B 3/30; B32B 17/06; B32B 37/06
See application file for complete search history.

(56) References Cited

U.S. PATENT DOCUMENTS

2003/0232450 A1* 12/2003 Yoshida ............ B01L 3/502707 436/164
2006/0165559 A1 7/2006 Greenstein et al.
(Continued)

FOREIGN PATENT DOCUMENTS

JP 2008-56496 A 3/2008
JP 2016-68018 A 5/2016

OTHER PUBLICATIONS

Japanese Office Action for Japanese Application No. 2021-206939, dated Oct. 8, 2024.
(Continued)

*Primary Examiner* — Lyle Alexander
*Assistant Examiner* — Dwan A Gerido
(74) *Attorney, Agent, or Firm* — Birch, Stewart, Kolasch & Birch, LLP

(57) ABSTRACT

Provided is a synthetic quartz glass substrate for use in a microfluidic device to which bonding by optical contact can be applied in manufacturing a microfluidic device, and which has high adhesion in a bonded interface and does not cause defects such as non-bonding and breakage of the substrate and a defect in which air bubbles are sandwiched at the bonded interface.

A synthetic quartz glass substrate for use in a microfluidic device, wherein a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on a surface of the synthetic quartz glass substrate with a white interferometer.

8 Claims, 2 Drawing Sheets

(51) Int. Cl.
*B32B 17/06* (2006.01)
*B32B 37/06* (2006.01)

(52) U.S. Cl.
CPC .............. *B32B 17/06* (2013.01); *B32B 37/06* (2013.01); *B01L 2300/0654* (2013.01); *B32B 2307/538* (2013.01); *B32B 2315/08* (2013.01)

(56) References Cited

U.S. PATENT DOCUMENTS

| | | | | |
|---|---|---|---|---|
| 2009/0260990 | A1* | 10/2009 | Yanagisawa ............ | F04B 17/00 204/641 |
| 2012/0142118 | A1 | 6/2012 | Brenna et al. | |
| 2021/0382386 | A1 | 12/2021 | Yarita et al. | |

OTHER PUBLICATIONS

Extended European Search Report for European Application No. 22214859.5, dated Apr. 24, 2023.

* cited by examiner

SYNTHETIC QUARTZ GLASS SUBSTRATE FOR USE IN MICROFLUIDIC DEVICE, SYNTHETIC QUARTZ GLASS MICROFLUIDIC DEVICE, AND METHOD FOR MANUFACTURING THE SAME

CROSS-REFERENCE TO RELATED APPLICATION

This non-provisional application claims priority under 35 U.S.C. § 119(a) on Patent Application No. 2021-206939 filed in Japan on Dec. 21, 2021, the entire contents of which are hereby incorporated by reference.

TECHNICAL FIELD

The invention relates to a synthetic quartz glass substrate for use in a microfluidic device, a synthetic quartz glass microfluidic device, and a method for manufacturing the same. More specifically, the invention relates to a synthetic quartz glass substrate for use in a microfluidic device capable of enhancing the adhesion in a bonded interface, a synthetic quartz glass microfluidic device, and a method for manufacturing the same.

BACKGROUND ART

A microfluidic device is capable of performing various chemical and biological operations such as mixing, reaction, separation, purification, culture, measurement, and detection with an extremely small amount of sample.

In the microfluidic device, a configuration suitable for various applications can be obtained by providing a functional region having various functions such as a reaction region in which a reagent is disposed in a fluidic channel called a microchannel. Examples of the application of the microfluidic device include biological substance analysis, DNA inspection, drug discovery/pharmaceutical development, organic synthesis, environmental analysis, food quality analysis, and measurement equipment.

In such a microfluidic device, chemical and biological operations such as mixing, reaction, separation, purification, culture, measurement, and detection are processed in a micro-scale space. So, the ratio of the surface area to the volume of the sample is increased, thus the operation can be performed at a high speed in a high accuracy, and an environmental load, time, cost, and space can be reduced.

The microfluidic device is typically formed by bonding a pair of substrates facing each other, and a fine fluidic channel is formed in a bonded surface of at least one of the substrates. A glass substrate which is composed of synthetic quartz glass, borosilicate glass or the like, a silicone resin substrate which is composed of polydimethylsiloxane (PDMS) or the like, or a silicon substrate or the like is used for the substrate. In particular, the glass substrate is excellent in optical characteristics, chemical resistance, weather resistance, long-term stability, and low substance-adsorbing properties, and among them, a synthetic quartz glass substrate is optimal as a substrate for use in a microfluidic device.

In the manufacture of the glass microfluidic device, examples of a method for bonding two glass substrates to compose a microfluidic device include a bonding by thermal fusion. In this method, a siloxane bond of Si—O—Si is formed between glass surfaces by a heat treatment, which makes it possible to firmly bond the glass substrates such that the glass substrates cannot be separated.

In the thermal fusion bonding for manufacturing a microfluidic device, the bonding surface of the glass substrate is required to have sufficient smoothness in order to enhance the adhesion in the bonded interface. When the boning surface of the substrate is not sufficiently smooth, defects such as non-bonding may occur and air bubbles can be sandwiched at the bonded interface.

In order to prevent such problems, it is common to use a glass substrate prepared for use in the microfluidic device, which has a bonding surface smoothed by polishing. Patent Document 1 proposes a glass substrate for use in the microfluidic device in which an in-plane plate thickness difference is 3 μm or less and an undulation in a measurement wavelength range of 0 to 5 mm is smoothed to 2 nm or less.

CITATION LIST

Patent Document 1: JP-A 2008-56496

SUMMARY OF THE INVENTION

However, when the surfaces of the substrates used for the microfluidic device described in Patent Document 1 are bonded by thermal fusion, it is necessary to perform a heating treatment in a state where a bonded surface is pressure-welded by a load of a pressurizing jig (or a weight of a ceramic material such as alumina), which is not sufficient in terms of productivity. Furthermore, there may be a problem that the substrate is broken or the surface irregularities of the pressure jig are transferred to the substrate.

An object of the invention is to provide a synthetic quartz glass substrate for use in a microfluidic device in which an optical contact can be applied to bond the surfaces of the substrate for manufacturing the microfluidic device and the surfaces have high adhesion in a bonded interface so that the defects such as non-bonding and a breakage of the substrate and a defect in which air bubbles are sandwiched at the bonded interface cannot be caused.

The inventors have found that a synthetic quartz glass substrate in which a maximum value of a cyclic average power spectral density at a spatial frequency of 0.4 me or more and 1.00 $mm^{-1}$ or less is $5.0\times10^{15}$ $nm^4$ or less, the maximum value being obtained by measuring any given region of 6.0 mm×6.0 mm on a surface (or a surface bonded by optical contact) of the synthetic quartz glass substrate with a white interferometer, is suitable for a microfluidic device because bonding by optical contact can be applied to the substrate and the adhesion in a bonded interface can be enhanced.

Here, the optical contact is a method of simply pressing smooth glass surfaces against each other and bringing the glass surfaces into close contact with each other to bond the glass surfaces. It is based on van der Waals force between the glass surfaces or hydrogen bonding between silanol groups on the surface of the glass which are formed by adsorption of water.

In one aspect, the invention provides a synthetic quartz glass substrate for use in, microfluidic devices, wherein a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on a surface of the synthetic quartz glass substrate with a white interferometer.

In a preferred embodiment, an arithmetic average roughness (Ra) obtained by measuring any given region of 10

μm×10 μm on the surface of the synthetic quartz glass substrate with an atomic force microscope is 1.0 nm or less.

In another aspect, the invention provides a method for manufacturing a synthetic quartz glass microfluidic device including a laminate in which two or more synthetic quartz glass substrates have a bonded surface where the synthetic quartz glass substrates are bonded to each other, a channel being formed in at least one of the surfaces constituting the bonded surface, the method comprising the steps of:

preparing the synthetic quartz glass substrates according to claim 1 or 2 for the two or more synthetic quartz glass substrates;

forming a channel in at least one of the surfaces which are to constitute bonded surfaces in the two or more prepared synthetic quartz glass substrates; and bonding the two or more synthetic quartz glass substrates which have been provided with the channel by optical contact such that the surface having been provided with the channel constitutes the bonded surface to form a laminate.

The method preferably further includes a step of thermally fusing the laminated synthetic quartz glass substrates after the bonding step.

In the thermally fusing step, a temperature of the thermal fusion is preferably 1,000° C. or higher and lower than 1,600° C.

In a further aspect, the invention provides a synthetic quartz glass microfluidic device comprising a laminate having bonded surfaces in which surfaces of two or more synthetic quartz glass substrates are bonded to each other, a channel being formed in at least one of the surfaces which constitute the bonded surface, wherein a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on the surface constituting the bonded surface with a white interferometer; and the surfaces of the two or more synthetic quartz glass substrates are bonded to each other by optical contact.

In a still further aspect, the invention provides a synthetic quartz glass microfluidic device comprising a laminate having bonded surfaces in which surfaces of two or more synthetic quartz glass substrates are bonded to each other, a channel being formed in at least one of the surfaces which constitute the bonded surface, wherein a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on the surface constituting the bonded surface with a white interferometer; and the surfaces of the two or more synthetic quartz glass substrates are bonded to each other by thermal fusion.

An arithmetic average roughness (Ra) obtained by measuring any given region of 10 μm×10 μm on the surface which constitutes the bonded surface with an atomic force microscope in the above devices is preferably 1.0 nm or less.

Advantageous Effects of the Invention

By applying optical contact for bonding the surfaces of the synthetic quartz substrate in manufacturing the microfluidic device, adhesion in a bonded interface of the substrate can be enhanced, and defects such as non-bonding and breakage of the substrate and a defect in which air bubbles are sandwiched at a bonded interface can be prevented, whereby the microfluidic device can be manufactured in a high productivity.

BRIEF DESCRIPTION OF THE DRAWINGS

FIG. 1A is an exploded perspective view of the microfluidic device. FIG. 1B is a plan view of the microfluidic device, FIG. 1C is a cross-sectional view taken along line C-C' of FIG. 1B, and FIG. 1D is a cross-sectional view taken along line D-D' of FIG. 113.

FIG. 2A is an exploded perspective view of the microfluidic device, FIG. 2B is a plan view of the microfluidic device, FIG. 2C is a cross-sectional view taken along line C-C' of FIG. 2B, and FIG. 2D is a cross-sectional view taken along line D-D' of FIG. 213.

DESCRIPTION OF THE PREFERRED EMBODIMENT

Figure 1A:
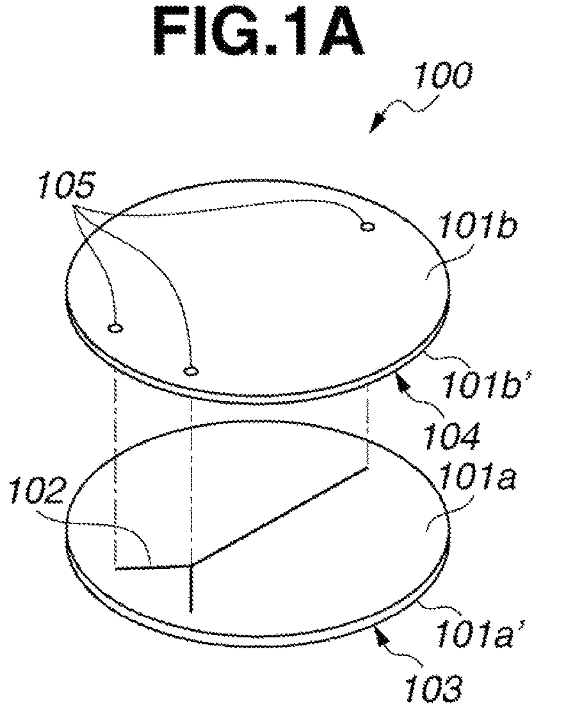
FIGS. 1A to 1D are schematic configuration diagrams showing an example of a microfluidic device manufactured using a synthetic quartz glass substrate for use in a microfluidic device according to one embodiment of the invention.

Hereinafter, the present invention is described in more detail.

Synthetic Quartz Glass Substrate for Use in Microfluidic Device

One embodiment of the invention is a synthetic quartz glass substrate for use in a microfluidic device. In a synthetic quartz glass substrate for use in a microfluidic device of the invention, in order to obtain sufficient adhesion in a bonded interface by optical contact in manufacturing the microfluidic device, a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on a surface (or a surface bonded by optical contact) with a white interferometer.

A cyclic average power spectral density PSI) (f), which is a function of a spatial frequency f, is calculated from discrete Fourier transform F (u, v) of a surface morphology Z (Px, Py) of a synthetic quartz glass substrate.

F (u, v) is calculated by the following formula (1).

$$F(u, v) = \sum_{p_x=0}^{N_x-1} \sum_{p_y=0}^{N_y-1} Z(p_x, p_y)\exp\left[-i2\pi\left(\frac{up_x}{N_x} + \frac{vp_y}{N_y}\right)\right] \tag{1}$$

Here, Nx and Ny are the numbers of measurement points in x and y directions when the surface morphology of the synthetic quartz glass substrate is measured. Px and Py are integers indicating the positions of the measurement points in the x and y directions, and are values of Px=0, 1, . . . , Nx−1, Py=0, 1, . . . , Ny−1. Meanwhile, u and v are values of u=−½, −½+1/Nx, . . . , ½, and v=−½, −½+1/Ny, . . . , ½.

By normalizing F (u, v) with measurement pitches Δx and Δy in the x and y directions and an area A=(NxΔx)×(NyΔy) of a measurement region as shown in the following formula (2), a power spectral density P (u, v) can be obtained.

Without this normalization, it is not possible to simply compare the power spectral densities calculated from the conditions of different measurement regions and measurement pitches.

$$P(u, v) = \frac{1}{A}|F(u, v)\Delta x\Delta y|^2 = \frac{A}{(N_x N_y)^2}|F(u, v)|^2 \quad (2)$$

The spatial frequency f (u, v) is expressed by the following formula (3).

$$f = \sqrt{\left(\frac{u}{\Delta x}\right)^2 + \left(\frac{v}{\Delta y}\right)^2} \quad (3)$$

The cyclic average power spectral density PSD (f) is obtained by averaging the power spectral density P (u, v) with respect to the spatial frequency f (u, v) as shown in the following formula (4).

$$PSD(f) = \sum_{f^2 < (u/\Delta x)^2 + (v/\Delta y)^2 \leq (f+\Delta f)^2} \frac{1}{N_f} P(u, v) \quad (4)$$

Here, Nf is the number of measurement points that satisfies the following formula (5).

$$f^2 < (u/\Delta x)^2 + (v/\Delta y)^2 \leq (f+\Delta f)^2 \quad (5)$$

$\Delta f$ is defined by the following formula (6) when $N_x\Delta x = N_y\Delta y$.

$$\Delta f = \frac{1}{N_x \Delta x} = \frac{1}{N_y \Delta y} \quad (6)$$

In the synthetic quartz glass substrate for use in a microfluidic device of the invention, a maximum value of a cyclic average power spectral density PSD (f) at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on a surface of the substrate with a white interferometer. The maximum value is preferably $2.0\times10^{15}$ $nm^4$ or less, more preferably $1.0\times10^{15}$ $nm^4$ or less, and still more preferably $1.0\times10^{14}$ $nm^4$ or less.

When the cyclic average power spectral density PSD (f) exceeds this range, the adhesion in the bonded interface cannot be maintained well in bonding by optical contact. When lamination and fixation cannot be performed by optical contact, or a bonding force becomes insufficient even if lamination and fixation can be performed, a problem that air bubbles are sandwiched at the bonded interface occurs.

In the invention, at least one surface (or surface bonded by optical contact) of two surfaces (or main surfaces) of the synthetic quartz glass substrate may have the above characteristics, but when both the surfaces are bonded by optical contact, both the surfaces preferably have the above characteristics.

The white interferometer can be appropriately selected from conventionally known ones, and used. Examples include NexView manufactured by Zygo.

An arithmetic average roughness (Ra) obtained by measuring any given region of 10 μm×10 μm on the surface for surface bonded by optical contact) of the synthetic quartz glass substrate of the invention with an atomic force microscope is not particularly limited as long as it allows optical contact. The arithmetic average roughness (Ra) is preferably 1.0 nm or less, more preferably 0.5 nm or less, still more preferably 0.4 nm or less, and yet still more preferably 0.3 nm or less.

If the arithmetic average roughness (Ra) is in such a range, the adhesion in the bonded interface can be maintained better in bonding by optical contact. It is possible to suppress a problem that lamination and fixation cannot be performed by optical contact or a problem that air bubbles are sandwiched at the bonded interface when a bonding force becomes insufficient even if lamination and fixation can be performed.

In the invention, among the two surfaces (or main surfaces) of the synthetic quartz glass substrate, the surface to be bonded by optical contact preferably has the average roughness, but when both the surfaces are bonded by optical contact, it is more preferable that both the surfaces have the average roughness.

The atomic force microscope can be appropriately selected from conventionally known ones, and used. Examples include NANO-IM-8 manufactured by PACIFIC NANOTECHNOLOGY.

The shape of the synthetic quartz glass substrate of the invention is not particularly limited, but may be a quadrangular shape such as a rectangle or a circular shape from the viewpoint of ease of manufacturing. For example, for a quadrangular substrate, a substrate having a side length of 10 to 1,000 mm is suitably used, and for a circular substrate, a substrate having a diameter of 10 to 1,000 mm is suitably used. In the case of a large synthetic quartz glass substrate, a large amount of microfluidic devices can be manufactured at a time by forming a channel serving as a fluidic passage of the microfluidic device by etching or laser processing, and then cutting by a method such as mechanical cutting or laser cutting. In the case of a small synthetic quartz glass substrate, a high-resolution lithography device can be adopted when a channel serving as a fluidic passage is formed, so that a microfluidic device having a finer fluidic channel can be manufactured.

The thickness of the synthetic quartz glass substrate of the invention is not particularly limited, and is appropriately selected, but is preferably 0.01 to 300 mm, more preferably 0.1 to 100 mm, and still more preferably 0.5 to 30 mm. If the thickness of the synthetic quartz glass substrate is too small, the synthetic quartz glass substrate may be apt to be broken during handling. The rigidity of the microfluidic device is insufficient, which may be apt to cause the microfluidic device to be broken during handling. Meanwhile, if the thickness of the synthetic quartz glass substrate is too large, it may be difficult to laminate a plurality of substrates. The microfluidic device may be less likely to be reduced in weight.

Method for Manufacturing Synthetic Quartz Glass Substrate for Use in Microfluidic Device Another embodiment of the invention is a method for producing a synthetic quartz glass substrate for use in a microfluidic device. A method for producing a synthetic quartz glass substrate for use in a microfluidic device of the invention is not particularly limited as long as the synthetic quartz glass substrate having the above characteristics can be obtained. For example, a synthetic quartz glass ingot manufactured by reacting a silica raw material compound such as a silane compound or a siloxane compound with an oxyhydrogen flame is molded into a desired shape, subjected to an annealing treatment, sliced into a desired thickness, then lapped, and subjected to outer periphery polishing as necessary to obtain a substrate stock. The substrate stock is subjected to rough polishing and precision polishing, whereby the synthetic quartz glass substrate can be manufactured.

Rough Polishing Step

A rough polishing step can be carried out by accompanying a polishing agent with a polishing pad formed with rigid foamed polyurethane.

Polishing pad may preferably have grooves so that the polishing agent spreads over the entire substrate. Full coverage of the substrate with the polishing agent minimizes in-plane polishing non-uniformity, resulting in an ease of controlling the surface shape. The shape of grooves in the polishing pad may be an array of striation having a plurality of parallel spaced-apart threads or furrows.

Examples of the polishing agent include those containing polishing abrasive grains of silica, ceria, alundum, white alundum (WA), FO, zirconia, SiC, diamond, titanic, and germania. Among them, those containing ceria are preferable. The particle size of the polishing abrasive grains is preferably 0.1 to 10 μm, more preferably 0.5 to 3 μm. As the polishing agent, water slurries containing these abrasive grains can be suitably used.

As a polishing machine, either a single-side polishing machine or a double-side polishing machine may be used but in general, the double-side polishing machine is preferable for finishing the thickness variation and flatness of the substrate with high accuracy.

Precision Polishing Step

A precision polishing step can be carried out by accompanying a polishing agent with a polishing pad such as a suede type soft polyurethane or a urethane impregnated nonwoven fabric.

Polishing pad may preferably have grooves so that the polishing agent spreads over the entire substrate. Since the polishing agent is uniformly supplied and sufficiently spreads over the substrate, scraps are quickly discharged through the groove, resulting in an ease of controlling the polishing speed and the surface shape. The shape of grooves in the polishing pad may be an array of striation.

Examples of the polishing agent include those containing polishing abrasive grains of colloidal silica, silica, ceria, alundum, white alundum (WA), FO, zirconia, SiC, diamond, titania, and germania. Among them, those containing colloidal silica are preferable. The particle size of the polishing abrasive grains is preferably 5 to 1,000 nm, and more preferably 5 to 150 nm. As the polishing agent, water slurries containing these abrasive grains can be suitably used.

As a polishing machine, either a single-side polishing machine or a double-side polishing machine may be used, but in general, but in general, the double-side polishing machine is preferable for finishing the thickness variation and flatness of the substrate with high accuracy.

Surface Shape Adjusting Step

A surface shape adjusting step can be appropriately carried out in the middle of the precision polishing step or before and after the precision polishing step. The surface shape adjusting step is a step of processing all or a part of the surface of the substrate on the basis of surface shape data measured in advance.

The processing method may be any method as long as it can process the surface of the substrate in the order of micrometers or less. Examples include etching such as wet etching and dry etching and polishing with a rotary polishing tool.

Microfluidic Device

A further embodiment of the invention is described with reference to the drawings, but the drawings are schematic or conceptual and dimensions, sizes, and ratios of members are not necessarily the same as actual dimensions, sizes, and ratios. Even when the same members are shown, the dimensions and the ratios may be different from each other in the drawings.

Figure 1B:
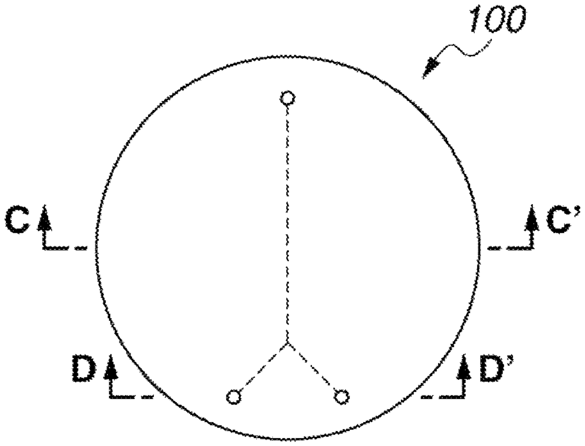
Figure 1C:
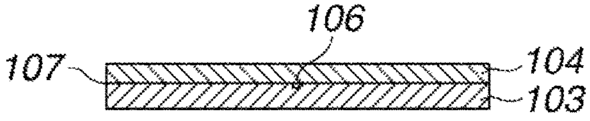
Figure 1D:
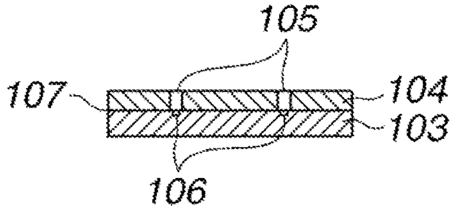

FIGS. 1A to 1D show a microfluidic device 100 (hereinafter, abbreviated as a "device 100") according to an embodiment of the invention. Specifically, FIG. 1A is an exploded perspective view according to an embodiment of the device 100. FIG. 1B is a plan view of the device 100. FIG. 1C is a cross-sectional view taken along line C-C' of FIG. 18. FIG. 1D is a cross-sectional view taken along line D-D' of FIG. 1B.

As shown in FIG. 1A, the device 100 includes a first synthetic quartz glass substrate 103 (for fluidic channel formation) having surfaces 101*a* and 101*a*' facing each other and having a Y-shaped channel 102 which is formed on the surface 101*a* (or surface to be bonded by optical contact) and does not penetrate throughout the substrate in its thickness direction, and a second synthetic quartz glass substrate 104 (for cover) having surfaces 101*b* and 101*b*' facing each other and to be bonded to the surface 101*a* of the first synthetic quartz glass substrate 103 in which the channel 102 is formed. The second synthetic quartz glass substrate 104 has through holes 105 at respective positions corresponding to three ends of the channel 102.

In this embodiment, the above-described synthetic quartz glass substrate for use in a microfluidic device of the invention is used as the first and the second synthetic quartz glass substrates. Surfaces of the two synthetic quartz glass substrates are bonded to each other by optical contact to form a laminate having a bonded surface 107 as shown in FIGS. 1C and 113, and the channel 102 in the first synthetic quartz glass substrate and the second synthetic quartz glass substrate 104 constitute a microfluidic channel 106 in the device 100.

In the device 100, the through hole 105 communicates with the outside of the device 100, and has a function of supplying a sample to the microfluidic channel 106 or discharging the sample from the microfluidic channel 106.

The microfluidic channel 106 in the microfluidic device is formed in an appropriate shape, and the sample is supplied from the through hole 105 to perform various chemical and biological operations such as mixing, reaction, separation, purification, culture, measurement, and detection.

In this embodiment, as shown in FIG. 1A, the channel 102 is formed in the surface 101*a* of the first synthetic quartz glass substrate 103, but the channel may be formed in either one of the surface 101*a* of the first synthetic quartz glass substrate 103 and the surface 101*b*' of the second synthetic quartz glass substrate 104, or may be formed in each of the substrates. When the channel is formed in the surface of each of the substrates, the channels having corresponding shapes at the corresponding positions may be formed such that the channels of both the substrates coincide with each other by bonding the two substrates, or the channels having different shapes may be formed at different positions.

There is one channel 102 in this embodiment, but more than one channels may be provided. Examples of the cross-sectional shape of a channel pattern include a rectangular shape, a circular shape, a semicircular shape, and a substantially semicircular shape.

The length, width, and depth of the microfluidic channel 106 can be appropriately selected according to the application of the device 100.

Furthermore, in this embodiment, the through hole 105 is formed only in the second synthetic quartz glass substrate 104, but may be formed only in the first synthetic quartz glass substrate, or may be formed in both the first and the second synthetic quartz glass substrates.

The through hole 105 has a columnar shape, but may have a prismatic shape. There may be a plurality of through holes provided as in this embodiment, but at least one through hole may be enough for the device 100. Furthermore, the size, namely diameter or width of the through hole 105 is not particularly limited, but from the viewpoint of manufacturing and handling, the diameter of the cylindrical shape is preferably 0.1 to 5 mm, and the length of one side of the prismatic shape is preferably 0.1 to 5 mm.

The microfluidic device of the invention is not limited to the above embodiment, and various modifications can be made. For example, a configuration shown in FIGS. 2A to 2D may be employed.

Figure 2A:
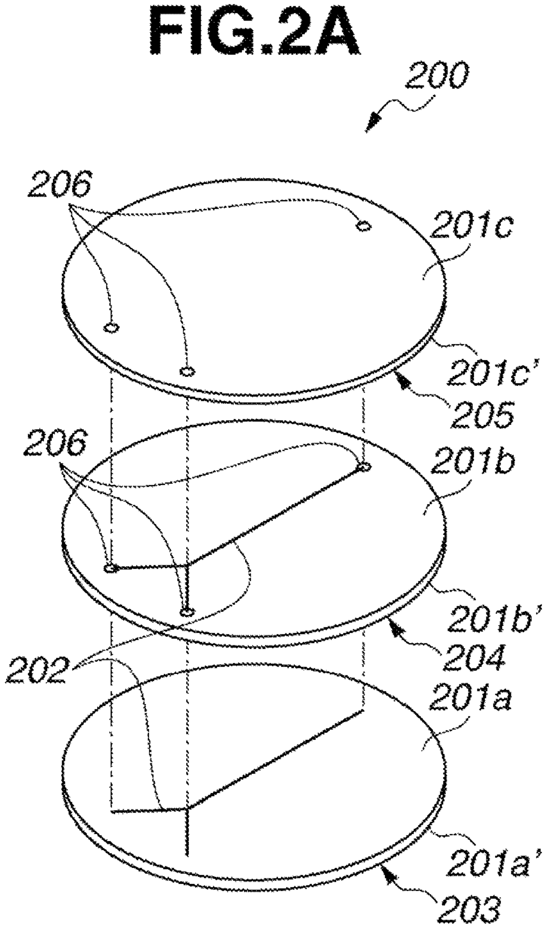
FIG. 2A to 2D are schematic configuration diagrams showing another example of a microfluidic device manufactured using a synthetic quartz glass substrate for use in a microfluidic device according to another embodiment of the invention.
Figure 2B:
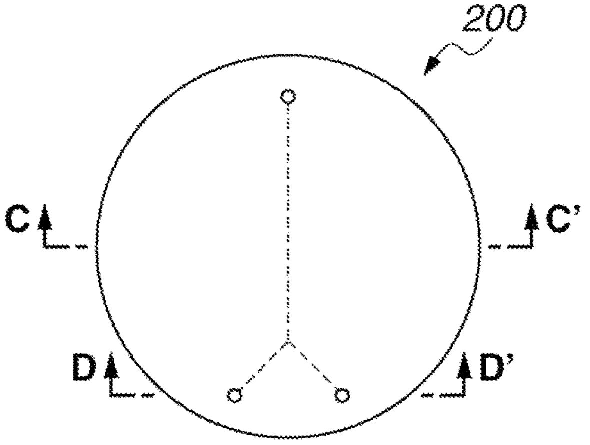
Figure 2C:
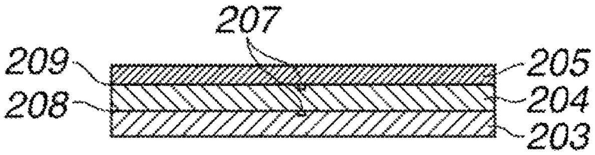
Figure 2D:
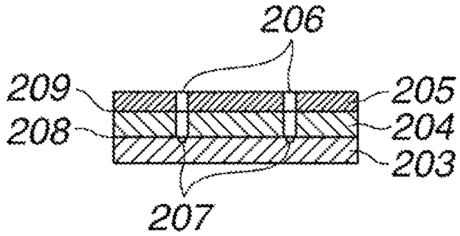

FIGS. 2A to 2D show a microfluidic device 200 (hereinafter, abbreviated as a "device 200") according to a still further embodiment of the invention. Specifically, FIG. 2A is an exploded perspective view of the device 200 according to a still further embodiment. FIG. 2B is a plan view of the device 200. FIG. 2C is a cross-sectional view taken along line C-C' of FIG. 2B. FIG. 2D is a cross-sectional view taken along line D-D' of FIG. 2B.

As shown in FIG. 2A, the device 200 includes a first synthetic quartz glass substrate 203 (for fluidic channel formation) having surfaces 201*a* and 201*a*' facing each other and having a Y-shaped channel 202 which is formed on the surface 201*a* (or surface to be bonded by optical contact) and does not penetrate throughout the substrate in its thickness direction, a second synthetic quartz glass substrate 204 (for fluidic channel formation and cover) having surfaces 201*b* and 201*b*' facing each other and to be bonded to the surface 201*a* having a channel 202 formed in the first synthetic quartz glass substrate 203 and having a Y-shaped channel 202 which is formed in the surface 201*b* (or surface to be bonded by optical contact), and a third synthetic quartz glass substrate 205 (for cover) having surfaces 201*c* and 201*c*' facing each other and to be bonded to the surface 201*b* having a channel 202 formed in the second synthetic quartz glass substrate 204.

The second synthetic quartz glass substrate 204 and the third synthetic quartz glass substrate 205 have through holes 206 for supplying and discharging a sample at respective positions corresponding to three ends of the channel 202.

In this embodiment, the above-described synthetic quartz glass substrate for use in a microfluidic device of the invention is used as the first, second, and third synthetic quartz glass substrates. Surfaces of the three synthetic quartz glass substrates are bonded to each other by optical contact to form a laminate having bonded surfaces 208 and 209 as shown in FIGS. 2C and 2D, and the channel 202 in the first substrate and the second substrate 204, and the channel 202 in the second substrate and the third substrate 205 form a microfluidic channel 207 in the device 200.

In the device 200, the through hole 206 communicates with the outside of the device 200, and has a function of supplying a sample to the microfluidic channel 207 or discharging the sample from the microfluidic channel 207.

In this embodiment, although the channel 202 is formed in the surface 201*a* of the first synthetic quartz glass substrate 203 and the surface 201*b* of the second synthetic quartz glass substrate 204 as shown in FIG. 2A, the channel may be formed in either one of the surface 201*a* of the first synthetic quartz glass substrate 203 and the surface 201*b*' of the second synthetic quartz glass substrate 204, or may be formed in each of the surfaces. Similarly, the channel may be formed in either one or both of the surface 201*b* of the second synthetic quartz glass substrate and the surface 241*c*' of the third synthetic quartz glass substrate.

When the channels are formed in the two surfaces to be bonded, the channels having corresponding shapes at the corresponding positions may be formed such that both the channels coincide with each other by bonding the two substrates, or the channels having different shapes may be formed at different positions.

The number and cross-sectional shape of the channels 202 are the same as described in FIGS. 1A to 1D, and the length, width, and depth of the microfluidic channel 207 can be appropriately selected according to the application of the device 200.

In this embodiment, the through holes 206 are formed in the second synthetic quartz glass substrate 204 and the third synthetic quartz glass substrate 205, but may be formed in the first synthetic quartz glass substrate 203 and the second synthetic quartz glass substrate 204, may be formed in the first synthetic quartz glass substrate 203 and the third synthetic quartz glass substrate 205, or may be formed in all of the first synthetic quartz glass substrate 203, the second synthetic quartz glass substrate 204, and the third synthetic quartz glass substrate 205.

The shape and the size of the through hole 206 are the same as described with reference to FIGS. 1A to 1D.

Although not particularly illustrated, for example, four or more synthetic quartz glass substrates of the invention may be bonded to form a microfluidic device. With such a configuration, a large number of microfluidic channels can be arranged in parallel or stacked, whereby a microfluidic device having more excellent throughput can be obtained in a good productivity. In this case, in consideration of the influence on optical contact caused by an increase in warpage of the synthetic quartz glass substrate due to the lamination of a large number of synthetic quartz glass substrates, the number of the synthetic quartz glass substrates or the number to be laminated is preferably 50 or less, and more preferably 20 or less.

Furthermore, for example, the channels may be provided in both the surfaces to be bonded, or the channels may penetrate throughout the substrate in its thickness direction. With such a configuration, the microfluidic channel can have various forms. A large number of microfluidic channels can be arranged in parallel or stacked, whereby a microfluidic device having more excellent throughput can be obtained in a good productivity.

In the microfluidic device of the invention, the synthetic quartz glass substrates bonded by optical contact can be peeled off or separated at the bonded interface without breaking them. The bonded interface can be visually observed from above or below the laminated substrates or on the side surface thereof.

By performing a heat treatment described later, the surfaces of the synthetic quartz glass substrates can be thermally fused to each other to be more firmly bonded. In this case, the glass substrates bonded by thermal fusion cannot be peeled off or separated without breaking the substrates. It may be difficult or impossible to visually observe the bonded interface from above or below the laminated substrates or even on the side surface thereof.

Method for Manufacturing Microfluidic Device

A still further embodiment of the invention is a method for manufacturing a microfluidic device using the synthetic quartz glass substrate for use in a microfluidic device of the invention.

The microfluidic device of the invention can be manufactured, for example, by a method including the following steps:

(1) a preparing step of preparing two or more synthetic quartz glass substrates for use in a microfluidic device of the invention;

(2) a channel tanning step of forming a channel in at least one of the two surfaces which are to constitute a bonded surface of a microfluidic device of the two or more prepared synthetic quartz glass substrates; and (3) a bonding step of bonding the two or more synthetic quartz glass substrates after the channel forming step by optical contact such that the surface having been provided with the channel constitutes the bonded surface to form a laminate.

Preparing Step

In the preparing step, synthetic quartz glass for use in a microfluidic device of the invention is prepared. Two or more, preferably three or more synthetic quartz glass substrates are prepared according to the application of the microfluidic device to be manufactured.

Channel Forming Step

In the channel forming step, at least one of the two surfaces are selected from among the surfaces of the prepared two or more synthetic quartz glass substrates. Then, a channel is formed in the above at least one surface, which is to constitute the bonded surface of the microfluidic device.

For example, as shown in FIG. 1A, the channel 102 is formed in the surface 101*a* of the first synthetic quartz glass substrate 103.

For the formation of the channel 102, a physical processing method such as machine cutting using a machining center or other numerical control machine tools, or blasting, or etching such as wet etching and dry etching can be used. Among them, the channel is preferably formed by etching that can achieve both the accuracy and productivity of formation of the channel.

Through Hole Forming Step

In the invention, it is preferable to carry out a through hole forming step of forming a predetermined number of through holes at a predetermined position of the synthetic quartz glass substrate so as to correspond to the channel formed in the channel forming step.

When the through hole forming step is carried out, the through hole 105 can be formed in the second synthetic quartz glass substrate 104 to penetrate throughout the substrate in its thickness direction. For the formation of the through hole 105, a known method including a physical processing method such as machine cutting using a machining center or other numerical value control machine tools, or blasting, or etching such as wet etching or dry etching can be used. Among them, from the viewpoint of excellent productivity, the through hole 105 is preferably formed by cutting using a machining center.

Washing Step

In the invention, it is preferable to carry out a washing step of washing the synthetic quartz glass substrate having a channel formed therein and the synthetic quartz glass substrate having a through hole formed therein.

When the washing step is carried out, for example, it is preferable to appropriately wash the first and the second synthetic quartz glass substrates before bringing them into close contact with each other.

The synthetic quartz glass substrate may be washed by any method as long as particles having a width of 100 μm or more can be removed, and examples include a method using pure water, an alcoholic solvent, an acidic solution such as sulfuric acid, an alkali solution such as ammonia water, and a surfactant. The exemplified washing methods may be carried out alone or in combination of two or more kinds thereof. Ultrasonic wave can also be applied in combination.

Bonding Step

In the bonding step, two or more synthetic quartz glass substrates including a synthetic quartz glass substrate provided with a channel are bonded by optical contact such that a surface having the channel formed therein constitutes a bonded surface thus to prepare a laminate.

In this step, the first synthetic quartz glass substrate 103 provided with the channel 102 and the second synthetic quartz glass substrate 104 having the through hole 105 are bonded by optical contact such that the surface provided with the channel 102 forms a bonded surface and thus laminated.

The step of bonding and laminating by optical contact is carried out by bringing the surface 101*a* of the first synthetic quartz glass substrate 103 and the surface 101*b*' of the second synthetic quartz glass substrate 104 into close contact with each other.

In the bonding by optical contact, the substrate can be separated and re-bonded without being broken. As a result, the microfluidic channel can be easily washed and reprocessed, and can be reused any number of times.

Thermal Fusing Step

In the manufacturing method of the invention, it is preferable to carry out a thermal fusing step of thermally fusing the laminated synthetic quartz glass substrates bonded by optical contact.

When the thermal fusing step is carried out, the synthetic quartz glass substrate laminated by bonding by optical contact is placed in an electric furnace and subjected to a heat treatment at a temperature of preferably 1,000° C. or higher and lower than 1,600° C., and more preferably 1,000° C. or higher and 1,400° C. or lower, in this way, it is not necessary to perform a heating treatment in a state where the bonded surface is brought into pressure contact with the load of a pressurizing jig, and it is possible to prevent problems such as breakage of the substrate and transfer of surface irregularities of the pressurizing jig to the substrate. Since the weighting step is not required, productivity is also improved.

By performing the thermal fusing step, a siloxane bond of Si—O—Si is formed between glass surfaces, whereby so firm bonding can be provided that the substrates cannot be separated. This makes it possible to suppress problems such as liquid leakage when the sample is supplied at a high pressure and a high flow rate.

The embodiments of the invention have been described above, but the invention is not limited to the above embodiments, and various modifications can be made. All of them are included in the technical scope of the invention.

EXAMPLES

Examples of the invention are given below by way of illustration and not by way of limitation.

Example 1

A sliced synthetic quartz glass raw material was lapped by a double-side lapping machine performing planetary motion to obtain two intermediate substrate stocks.

Thereafter, rough polishing was carried out using a hard urethane polishing pad having a groove with an array of striation and a cerium oxide polishing agent by a double-side polishing machine performing a planetary motion.

Then, precision polishing was carried out using a suede polishing pad and a colloidal silica polishing agent by the double-side polishing machine performing planetary motion to obtain a first synthetic quartz glass substrate having a diameter of 6 inches and a thickness of 0.5 mm.

When any given region of 6.0 mm 6.0 mm on the surface (or the surface to be bonded by optical contact) of the obtained first synthetic quartz glass substrate was measured under the condition of the number of pixels of 1240×1240 using a white interferometer NexView manufactured by Zygo Corporation (the same applies hereinafter), the maximum value of a cyclic average power spectral density at a spatial frequency of 0.4 $mm^{-1}$ or more and 100 $mm^{-1}$ or less was $7.0\times10^{13}$ $nm^4$.

When any given region of 10 μm×10 μm on the same surface was measured by an atomic force microscope NANO-IM-8 manufactured by PACIFIC NANOTECHNOLOGY (hereinafter the same applies), an arithmetic average roughness (Ra) was 0.21 nm.

A second synthetic quartz glass substrate was obtained in the same manner as described above.

The surface (or the surface to be bonded by optical contact) of the second synthetic quartz glass substrate was also measured in the same manner, and as a result, the maximum value of a cyclic average power spectral density at a spatial frequency of 0.4 $mm^{-1}$ or more and 100 $mm^{-1}$ or less was $7.0\times10^{13}$ $nm^4$, and an arithmetic average roughness (Ra) was 0.21 nm.

A chromium membrane and a photoresist were formed on the surface (or the surface to be bonded by optical contact) of the first synthetic quartz glass substrate, and then subjected to exposure and development using a photomask to form an etching mask having a predetermined shape.

Thereafter, wet etching processing was carried out using an aqueous hydrofluoric acid solution containing ammonium fluoride to form a channel having a substantially semicircular cross section with a maximum width of 70 μm and a depth of 30 μm.

Next, a through hole having a diameter of 1.0 mm was formed to penetrate throughout the substrate in its thickness direction at a predetermined position of the second synthetic quartz glass substrate using a machining center.

Then, the first synthetic quartz glass substrate having the channel and the second synthetic quartz glass substrate having the through hole were washed with an aqueous potassium hydroxide solution, hot concentrated sulfuric acid, a weak alkaline surfactant, and pure water, and then subjected to isopropyl alcohol drying.

Subsequently, the surfaces (the surfaces to be bonded) of the first and the second synthetic quartz glass substrate were brought into close contact with each other, and bonded by optical contact to form a laminate, thereby obtaining a microfluidic device.

When the bonded interface of the microfluidic device was visually confirmed, no unbonded place and air bubbles were observed.

Next, the obtained microfluidic device was thermally fused at 1,100° C. in an electric furnace.

When the bonded interface of the microfluidic device was visually confirmed, no unbonded place and air bubbles were observed.

Example 2

A total of six synthetic quartz glass substrates (first to sixth synthetic quartz glass substrates) were prepared in the same procedure as in Example 1.

The surfaces (or the surfaces to be bonded by optical contact) of the first to sixth synthetic quartz glass substrates were measured in the same manner as in Example 1, and as a result, the maximum value of a cyclic average power spectral density at a spatial frequency of 0.4 $mm^{-1}$ or more and 100 $mm^{-1}$ or less was $7.0\times10^{13}$ $nm^4$, and an arithmetic average roughness (Ra) was 0.21 nm.

Next, a channel having a substantially semicircular cross section was formed in one surface (or the surface to be bonded by optical contact) of each of the first to fifth synthetic quartz glass substrates in the same procedure as in Example 1.

Then, a through hole was formed to penetrate throughout the substrate in its thickness direction at a predetermined position of each of the second to sixth synthetic quartz glass substrates in the same procedure as in Example 1.

Thereafter, the first to sixth synthetic quartz glass substrates were washed and dried in the same procedure as in Example 1.

Subsequently, the surface of the first synthetic quartz glass substrate which is provided with the channel and the surface of the second synthetic quartz glass substrate which is opposed to the surface provided with the channel, the surface of the second synthetic quartz glass substrate which is provided with the channel and the surface of the third synthetic quartz glass substrate which is opposed to the surface provided with the channel, the surface of the third synthetic quartz glass substrate which is provided with the channel and the surface of the fourth synthetic quartz glass substrate which is opposed to the surface provided with the channel, the surface of the fourth synthetic quartz glass substrate which is provided with the channel and the surface of the fifth synthetic quartz glass substrate which is opposed to the surface provided with the channel, the surface of the fifth synthetic quartz glass substrate which is provided with the channel and the surface of the sixth synthetic quartz glass substrate are brought into close contact with each other to bond the surfaces (or the surfaces to be bonded) by optical contact, thereby forming a laminate in which the first to sixth synthetic quartz glass substrates are sequentially laminated. A microfluidic device in which five fluidic channels were laminated was obtained.

When the five bonded interfaces of the obtained microfluidic device were visually confirmed, no unbonded place and air bubbles were observed at any bonded interface.

Next, the obtained microfluidic device was thermally fused in the same procedure as in Example 1.

When the five bonded interfaces of the microfluidic device were visually confirmed, no unbonded place and air bubbles were observed at any bonded interface.

Comparative Example 1

A first synthetic quartz glass substrate was prepared in the same procedure as in Example 1.

The surface (or the surface bonded by optical contact) of the synthetic quartz glass substrate was measured in the same manner as in Example 1, and as a result, the maximum value of a cyclic average power spectral density at a spatial frequency of 0.4 $mm^{-1}$ or more and 100 $mm^{-1}$ or less was $7.0\times10^{13}$ $nm^4$, and an arithmetic average roughness (Ra) was 0.21 nm.

A second synthetic quartz glass substrate was prepared in the same procedure as in Example 1 accept that a rough polishing time was shortened and a precision polishing time was also shortened.

When any given region of 6.0 mm×6.0 mm on the surface (or the surface to be bonded by optical contact) of the obtained second synthetic quartz glass substrate was measured by a white interferometer in the same manner as in Example 1, the maximum value of a cyclic average power spectral density at a spatial frequency of 0.4 $mm^{-1}$ or more and 100 $mm^{-1}$ or less was $1.0\times10^{16}$ $nm^4$.

When any given region of 10 μm×10 μm on the same surface was measured by an atomic force microscope, an arithmetic average roughness (Ra) was 0.37 nm.

Next, a channel having a substantially semicircular cross section was formed in the surface (or the surface to be bonded) of the first synthetic quartz glass substrate in the same procedure as in Example 1.

Then, a through hole was formed to penetrate throughout the substrate in its thickness direction at a predetermined position of the second synthetic quartz glass substrate in the same procedure as in Example 1.

Thereafter, the first synthetic quartz glass substrate provided with the channel and the second synthetic quartz glass substrate having the through hole were washed and dried in the same procedure as in Example 1, and the surfaces (or the surfaces to be bonded) were brought into close contact with each other and bonded by optical contact to form a laminate, thereby obtaining a microfluidic device. When the bonded interface of the microfluidic device was visually confirmed, interference fringes and bubbles caused by non-bonding were observed.

Next, the obtained microfluidic device was thermally fused in the same procedure as in Example 1.

When the bonded interface of the microfluidic device was visually confirmed, interference fringes and bubbles caused by non-bonding were observed. It was observed that since the gas in the bubbles expanded, the area of the air bubbles was enlarged as compared with that before thermal fusion bonding.

Japanese Patent Application No. 2021-206939 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A synthetic quartz glass substrate for use in microfluidic devices, wherein the synthetic quartz glass substrate has a property of a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on a surface of the synthetic quartz glass substrate with a white interferometer; and an arithmetic average roughness (Ra) obtained by measuring any given region of 10 μm×10 μm on the surface of the synthetic quartz glass substrate with an atomic force microscope is 1.0 nm or less.

2. A method for manufacturing a synthetic quartz glass microfluidic device including a laminate in which two or more synthetic quartz glass substrates have a bonded surface where the synthetic quartz glass substrates are bonded to each other, a channel being formed in at least one of the surfaces constituting the bonded surface, the method comprising the steps of:

preparing the synthetic quartz glass substrates according to claim 1 for the two or more synthetic quartz glass substrates;

forming a channel in at least one of the surfaces which are to constitute bonded surfaces in the two or more prepared synthetic quartz glass substrates; and bonding the two or more synthetic quartz glass substrates which have been provided with the channel by optical contact such that the surface having been provided with the channel constitutes the bonded surface to form a laminate.

3. The method according to claim 2 further comprising a step of thermally fusing the laminated synthetic quartz glass substrates after the bonding step.

4. The method according to claim 3, wherein a temperature of the thermal fusion is 1,000° C. or higher and lower than 1,600° C.

5. A synthetic quartz glass microfluidic device comprising a laminate having bonded surfaces in which surfaces of two or more synthetic quartz glass substrates are bonded to each other, a channel being formed in at least one of the surfaces which constitute the bonded surface, wherein each of the two or more synthetic quartz glass substrates has a property of a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on the surface constituting the bonded surface with a white interferometer; and the surfaces of the two or more synthetic quartz glass substrates are bonded to each other by optical contact.

6. A synthetic quartz glass microfluidic device comprising a laminate having bonded surfaces in which surfaces of two or more synthetic quartz glass substrates are bonded to each other, a channel being formed in at least one of the surfaces which constitute the bonded surface, wherein each of the two or more synthetic quartz glass substrates has a property of a maximum value of a cyclic average power spectral density at a spatial frequency of 0.4 $mm^{-1}$ or more and 100 $mm^{-1}$ or less is $5.0\times10^{15}$ $nm^4$ or less, the maximum value being obtained by measuring any given region of 6.0 mm×6.0 mm on the surface constituting the bonded surface with a white interferometer; and the surfaces of the two or more synthetic quartz glass substrates are bonded to each other by thermal fusion.

7. The synthetic quartz glass microfluidic device according to claim 5, wherein an arithmetic average roughness (Ra) obtained by measuring any given region of 10 μm×10 μm on the surface which constitutes the bonded surface with an atomic force microscope is 1.0 nm or less.

8. The synthetic quartz glass microfluidic device according to claim 6, wherein an arithmetic average roughness (Ra) obtained by measuring any given region of 10 μm×10 μm on the surface which constitutes the bonded surface with an atomic force microscope is 1.0 nm or less.

* * * * *